United States Patent [19]

Householder et al.

[11] 3,846,329

[45] Nov. 5, 1974

[54] ANTIFOAM COMPOSITION

[75] Inventors: Kermit W. Householder, Tonawanda, N.Y.; Van I. Doesburg, Midland, Mich.

[73] Assignee: Dow Corning Corporation, Midland, Mich.

[22] Filed: Apr. 9, 1973

[21] Appl. No.: 349,606

Related U.S. Application Data

[62] Division of Ser. No. 144,264, May 17, 1971, Pat. No. 3,785,935.

[52] U.S. Cl.............................. 252/358, 252/321
[51] Int. Cl........................................... B01d 19/04
[58] Field of Search................................... 252/358

[56] References Cited
UNITED STATES PATENTS

| | | | |
|---|---|---|---|
| 2,782,162 | 2/1957 | Liddell, Jr. | 203/20 X |
| 2,881,204 | 4/1959 | Kirkpatrick | 252/358 X |
| 3,233,986 | 2/1966 | Morehouse | 252/358 X |
| 3,304,266 | 2/1967 | Sullivan | 252/358 |
| 3,402,192 | 9/1968 | Haluska | 260/448.2 B |

Primary Examiner—Richard D. Lovering
Attorney, Agent, or Firm—Jack E. Moermond

[57] ABSTRACT

An antifoam composition which consists essentially of (1) 5 to 50 percent by weight of a silicone-glycol copolymer, (2) 5 to 50 percent by weight of a polypropylene glycol, (3) 5 to 50 percent by weight of a glycol copolymer, and (4) 40 to 85 percent by weight of water is disclosed. This composition is particularly useful in latexes.

4 Claims, No Drawings

ANTIFOAM COMPOSITION

This is a division of application Ser. No. 144,264, filed May 17, 1971, and now U.S. Pat. No. 3,785,935.

This invention relates to an antifoam or defoaming composition. More specifically this invention relates to such a composition which consists essentially of (1) 5 to 50 percent by weight of a silicone-glycol copolymer having the general formula $(CH_3)_3SiO[(CH_3)_2SiO]_x[(CH_3)GSiO]_ySi(CH_3)_3$ wherein $x$ has an average value from 6 to 420, $y$ has an average value from 3 to 30, and G is a radical of the structure $-D(OR)_zA$ wherein D is an alkylene radical, R is composed of ethylene radicals and radicals selected from the group consisting of propylene and butylene radicals, the amount of ethylene radicals relative to the other alkylene radicals being such that the ratio of carbon atoms to oxygen atoms in the total OR block ranges from 2.3:1 to 2.8:1, $z$ has an average value from 10 to 100, and A is a capping group, (2) 5 to 50 percent by weight of polypropylene glycol having an average molecular weight in the range of 1000 to 2000, (3) 5 to 50 percent by weight of a glycol copolymer having the general formula $CH_2=CH-D'_m-(OC_2H_4)_a(OC_3H_6)_bR'$ wherein $a$ and $b$ each are integers greater than zero and each has an average value such that the copolymer has an average molecular weight in the range of 2000 to 3000, D' is an alkylene radical containing from 1 to 16 carbon atoms, $m$ is zero or one, and R' is a capping group, and (4) 40 to 85 percent by weight of water.

The depression and/or suppression of foam in many systems is a problem. Each system is unique and requires it's own antifoamer or defoamer. And while a particular composition may function well as an antifoam, it may at the same time introduce a new problem. The foregoing is true of latex systems.

It is an object of this invention to provide a new antifoam or defoaming composition which is particularly useful in latexes.

By way of example, during the preparation of styrene-butadiene latexes in emulsion the conversion of monomers to polymers is terminated at about 70 to 75 percent conversion as higher conversions yield polymers with inferior properties. The unreacted butadiene is generally removed by flashing at atmospheric and then reduced pressures. Finally, the unreacted styrene is removed by steam stripping (distilling) where foaming is a problem. Acrylonitrile-butadiene latexes are made by an analogous process. Other synthetic latexes also present similar foaming problems during preparation. Therefore, another object of this invention is to provide an antifoam composition which can be used in latexes, which composition significantly reduces the foaming problems during preparation.

Another object of this invention is to provide an antifoam composition which can be used in latexes which composition does not cause fisheyeing when the latex is subsequently used in making coating compositions.

Other objects and advantages of this invention will be apparent from the following description and examples.

The first component of the composition of this invention is a silicone-glycol copolymer having the general formula $(CH_3)_3SiO[(CH_3)_2SiO]_x[(CH_3)GSiO]_ySi(CH_3)_3$. In this copolymer the number of dimethylsiloxane units, as defined by $x$, can range from 6 to 420. Preferably $x$ has an average value from 50 to 100.

The number of methyl-glycol siloxane units in the copolymer is defined by $y$ which can have an average value ranging from 3 to 30 but which preferably falls in the range of 5 to 10.

The glycol portion of the copolymer is designated as G which is defined as a radical of the structure $-D(OR)_zA$. The glycol is attached to the silicon atom via alkylene radical D which contains from 1 to 30 carbon atoms and which preferably contains from 1 to 18 carbon atoms. Specific examples of D are the methylene, ethylene, propylene, isopropylene, butylene, octylene, decylene, octadecylene and myricylene radicals.

The (OR) portion of the glycol radical defines the alkylene oxide which constitutes the backbone of the glycol. It can consist of ethylene oxide units (R is an ethylene radical) and propylene oxide units (R is a propylene radical), ethylene oxide units and butylene oxide units (R is a butylene radical), or ethylene oxide units with propylene oxide units and butylene oxide units. However, the proportion of the ethylene oxide to the other alkylene oxides must be such that the ratio of carbon atoms to oxygen atoms in the total (OR) block ranges from 2.3:1 to 2.8:1. The total number of (OR) groups is defined by $z$ which has an average value from 10 to 100.

The A radical in the glycol portion of the copolymer is a capping group. By way of illustration, the glycol can be hydroxy, acyl, ether or carbonate ester capped. Preferably there is no more than a total of 15 atoms in A.

The silicone-glycol copolymers described above are well known materials with some of them being commercially available. For those unfamiliar with them attention is directed to U.S. Pat. No. 3,402,192 whose disclosure is incorporated by reference. This patent sets forth typical methods of preparation and a more detailed description of these materials.

The silicone-glycol copolymer can amount to 5 to 50 percent by weight of the total composition. It is preferable, however, that it be present in an amount ranging from 5 to 15 percent.

The second component of the composition of this invention is a polypropylene glycol. These glycols are also commercially available materials. It has been found that in addition to being a polypropylene glycol, the molecular weight must be in the range of 1000 to 2000 with a molecular weight range of 1200 to 1800 being preferred. The amount of this component can also be from 5 to 50, preferably 5 to 15, percent by weight of the total composition.

The third component of the composition of this invention is a glycol copolymer having the general formula $CH_2=CH-D'_m-(OC_2H_4)_a(OC_3H_6)_bR'$. It has been found that in this copolymer $a$ and $b$ each are integers greater than zero and each must have average values such that the average molecular weight of the copolymer is in the ragne of 2000 to 3000. Preferably the average molecular weight of the copolymer should be in the range of 2200 to 2800.

The D' radical in the glycol is an alkylene radical containing from 1 to 16 carbon atoms and is illustrated by the methylene, ethylene, propylene, butylene, isobutylene, octylene, decylene, dodecylene and hexadecylene radicals. Preferably D' is a methylene or ethylene radical. There can be zero or one D' radical in the glycol, i.e. m can be zero or one.

The R' radical is a capping group and reference is made to A above for illustrations of specific capping groups which can be employed.

The glycol copolymers useful as component three are known materials, can be prepared by known techniques, and are commercially available. While the amount used is preferably 5 to 15 percent it can vary from 5 to 50 percent.

The fourth and final essential component of the composition of this invention is water. It makes up the balance of the composition and ranges in amount from 40 to 85 percent by weight of the total composition. Preferably the amount of water will be in the range of 65 to 75 percent.

So far as is known at this time there is no critical order of mixing the four components of the composition. They can simply be added together with agitation to obtain a relatively homogenous mixture.

The particular amount of the antifoam composition of this invention to be used for antifoaming purposes varies widely. Such factors as the type of product having the foam problem, the process involved, the equipment being used, and the extent to which one wishes to control the foaming determines the amount used. Thus it is difficult to set any meaningful numerical limitations as to the amount of antifoam composition to be employed. In practice, for example, anywhere from 5 parts of antifoam composition per million parts of composition being defoamed to 5 percent by weight of antifoam composition based on the weight of the composition being defoamed, may be used with satisfactory results depending on the situation.

Now in order that those skilled in the art may better understand how the present invention can be practiced, the following examples are given by way of illustration and not by way of limitation. All parts and percents referred to herein are on a weight basis unless otherwise specified.

EXAMPLE 1

To a 32 ounce bottle there was added 300 ml. of unstripped styrene-butadiene rubber latex. This latex was heated to 90°C. by placing the bottle in a boiling water bath. Then steam was blown through the latex. Shortly after the steam is introduced the unreacted monomers began to distill from the system causing foaming. In two minutes the foam had reached a height of 9 cm. and after four minutes was 5 cm. After the monomers had been stripped from the latex it was allowed to cool to room temperature. It was then filtered by passing it through 100 mesh and 325 mesh screens. The particles removed during filtration were preflock, large amounts of which are undesirable. A 0.003 inch thick film of the filtered latex was cast on a clean glass plate. Less than 5 fisheyes were observed in a 1½inch × 7 inch strip. This control has an undesirable degree of foaming but passed the preflock and fisheye tests.

The above procedure was repeated except that 0.3 cc. of an antifoam composition of this invention was added to the latex just prior to the introduction of the steam. The antifoam composition consisted essentially of 10 percent of a silicone-glycol copolymer having the formula

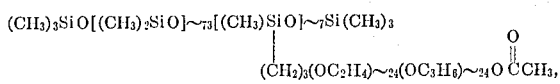
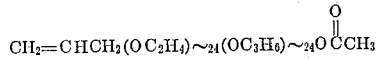

10 percent of polypropylene glycol having a molecular weight of about 1500, 10 percent of a glycol copolymer having the formula $$CH_2=CHCH_2(OC_2H_4)_{24}(OC_3H_6)_{24}O\overset{O}{\overset{\|}{C}}CH_3$$

and having a molecular weight of about 2400, and 70 percent water. In two minutes after the introduction of the steam the foam had reached a height of 6 cm. and after four minutes was 2 cm. The antifoam had significantly reduced the foaming and this composition also passed the preflock and fisheye tests.

EXAMPLE 2

When the above procedure is carried out using acrylonitrile-butadiene rubber latexes, the antifoam composition of this invention reduces the amount of foaming during the monomer stripping, and no preflock or fisheyeing problems are encountered.

EXAMPLE 3

When the antifoam compositions set forth below are substituted for the antifoam composition of Examples 1 and 2, there is a significant reduction in foaming and no preflock or fisheyeing problems are encountered. A. A composition consisting essentially of 5 percent of a silicone-glycol copolymer having the formula

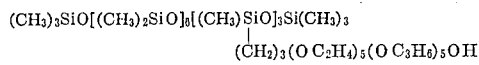
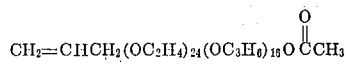

5 percent of propylene glycol having a molecular weight of about 1000, 5 percent of a glycol copolymer having the formula

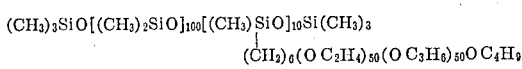

and having a molecular weight of about 2000, and 85 percent water. B. A composition consisting essentially of 15 percent of a silicone-glycol copolymer having the formula $$(CH_3)_3SiO[(CH_3)_2SiO]_{100}[(CH_3)SiO]_{10}Si(CH_3)_3$$
$$(CH_2)_6(OC_2H_4)_{50}(OC_3H_6)_{50}OC_4H_9$$

15 percent of propylene glycol having a molecular weight of about 2000, 15 percent of a glycol copolymer having the formula $CH_2=CH(OC_2H_4)_{32}(OC_3H_6)_{30}OC_4H_9$ and having a molecular weight of about 3000, and 55 percent water. C. A composition consisting essentially of 10 percent of a silicone-glycol copolymer having the formula

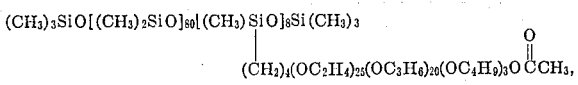

10 percent of propylene glycol having a molecular weight of about 1600, 10 percent of a glycol copolymer having the formula

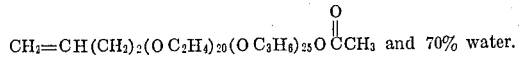

That which is claimed is:

1. An antifoam composition which consists essentially of
   1. 5 to 50 percent by weight of a silicone-glycol copolymer having the general formula $(CH_3)_3SiO[(CH_3)_2SiO]_x[(CH_3)GSiO]_ySi(CH_3)_3$ wherein
      $x$ has an average value from 6 to 420,
      $y$ has an average value from 3 to 30, and
      G is a radical of the structure $-D(OR)_zA$ wherein D is an alkylene radical containing from 1 to 30 carbon atoms,
      R is composed of ethylene radicals and radicals selected from the group consisting of propylene and butylene radicals, the amount of ethylene radicals relative to the other alkylene radicals being such that the ratio of carbon atoms to oxygen atoms in the total OR block ranges from 2.3:1 to 2.8:1,
      $z$ has an average value from 10 to 100, and
      A is a capping group selected from the group consisting of hydroxy, acyl, ether and carbonate ester capping groups;
   2. 5 to 50 percent by weight of polypropylene glycol having an average molecular weight in the range of 1000 to 2000,
   3. 5 to 50 percent by weight of a glycol copolymer having the general formula $ch_2=CH-D°_m-(OC_2H_4)_a(OC_3H_6)_bR'$, wherein $a$ and $b$ each are integers greater than zero and each has an average value such that the opolymer has an average molecular weight in the range of 2000 to 3000, D' is an alkylene radical contraining from 1 to 16 carbon atoms, $m$ is zero or one, and R' is a capping group, selected from the group consisting of hydroxy, acyl, ether and carbonate ester capping groups; and
   4. 40 to 85 percent by weight of water.

2. An antifoam composition as defined in claim 1 consisting essentially of 5 to 13 percent of (1), 5 to 15 percent of (2), 5 to 15 percent of (3), and 65 to 75 percent of (4).

3. An antifoam composition as defined in claim 2 wherein in (1) $x$ is from 50 to 100, $y$ is from 5 to 10, D contains from 1 to 18 carbon atoms, R is composed of only ethylene and propylene radicals, (2) has an average molecular weight in the range of 1200 to 1800, and in (3) the copolymer has an average molecular weight of 2200 to 2800.

4. An antifoam composition as defined in claim 3 wherein (1) has the general formula

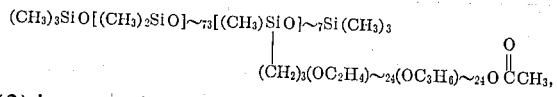

(2) is a propylene glycol having an average molecular weight of about 1500 and (3) is a glycol copolymer having the general formula 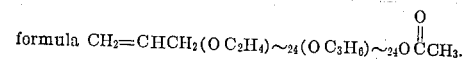

* * * * *

UNITED STATES PATENT AND TRADEMARK OFFICE
CERTIFICATE OF CORRECTION

PATENT NO. : 3,846,329
DATED : November 5, 1974
INVENTOR(S) : KERMIT W. HOUSEHOLDER, ET AL.

It is certified that error appears in the above-identified patent and that said Letters Patent are hereby corrected as shown below:

Column 5, line 29, the formula "$ch_2=CH-D°_m-$" should read --$CH_2=CH-D'_m-$--.

Column 5, line 32, the word "opolymer" should read --copolymer--.

Column 6, line 1, the word "contraining" should read --containing--.

Column 6, line 8, "13" should read --15--.

Column 6, lines 22-24, the formula

"$(CH_3)_3SiO[(CH_3)_2SiO]_{\sim 73}[(CH_3)SiO]_{\sim 7}Si(CH_3)_3$
                                      $|$
                                      $(CH_2)_3(OC_2H_4)_{\sim 24}(OC_3H_6)_{\sim 24}O\overset{O}{\overset{\|}{C}}CH_3$,"

should read

--$(CH_3)_3SiO[(CH_3)_2SiO]_{\sim 75}[(CH_3SiO]_{\sim 7}Si(CH_3)_3$
                                      $|$
                                      $(CH_2)_3(OC_2H_4)_{\sim 24}(OC_3H_6)_{\sim 24}O\overset{O}{\overset{\|}{C}}CH_3$,--

Signed and Sealed this

Twenty-eighth Day of December 1976

[SEAL]

Attest:

RUTH C. MASON
*Attesting Officer*

C. MARSHALL DANN
*Commissioner of Patents and Trademarks*